US005331212A

United States Patent [19]

Johnson-Williams et al.

[11] Patent Number: 5,331,212

[45] Date of Patent: Jul. 19, 1994

[54] ELECTRICAL DEVICE WITH ALTERNATIVE BATTERY POWER SUPPLIES

[75] Inventors: Mark Johnson-Williams, Half Moon Bay, Calif.; Zeb Billings, Hartland, Wis.

[73] Assignee: Western Publishing Company Inc., Racine, Wis.

[21] Appl. No.: 857,744

[22] Filed: Mar. 26, 1992

Related U.S. Application Data

[63] Continuation-in-part of Ser. No. 652,789, Feb. 8, 1991, Pat. No. 5,248,843.

[51] Int. Cl.$^5$ .................. H02J 7/00

[52] U.S. Cl. .................. 307/66; 307/150

[58] Field of Search .................. 307/64, 66, 150

[56] References Cited

U.S. PATENT DOCUMENTS 4,620,111 10/1986 McArthur et al. .
4,666,278 5/1987 Uematsu et al. .
4,767,358 8/1988 Nullmeyer et al. .
4,863,812 9/1989 Ueda et al. .
5,034,720 7/1991 Bell et al. .
5,061,579 10/1991 Ishimoto .

*Primary Examiner*—Jeffrey A. Gaffin
*Attorney, Agent, or Firm*—Amster, Rothstein & Ebenstein

[57] ABSTRACT

An electrical device characterized by alternative battery power supplies including an electrical circuit, a pre-installed first battery power supply disposed in a non-user-accessible portion of the device and a user-accessible compartment for receipt of a second battery power supply. The first supply is initially operatively connected to the circuit, and the presence of a second supply in the compartment operatively connects the second supply to the circuit to power the circuit regardless of the presence or absence of the first supply in the circuit. Preferably the first supply is mechanically operatively disconnected from the circuit when the second supply is in the compartment.

14 Claims, 2 Drawing Sheets

ELECTRICAL DEVICE WITH ALTERNATIVE BATTERY POWER SUPPLIES

CROSS-REFERENCE TO RELATED APPLICATION

The present application is a continuation-in-part of U.S. patent application Ser. No. 07/652,789 filed Feb. 8, 1991 now U.S. Pat. No. 5,248,843 (Sep. 28, 1993).

BACKGROUND OF THE INVENTION

The present invention relates to a battery-powered electrical device, and more particularly to such a device which is characterized by alternative battery power supplies.

Stores which sell battery-powered electrical devices must either expend the money and effort required to obtain and place batteries in the device specimens to be displayed or risk losing sales because the prospective customer cannot see the device in action and thus cannot fully appreciate it. Accordingly, many stores expend the requisite effort and money to place batteries in the designated user-accessible battery compartment before putting a device on display. Even this does not completely solve the problem since on occasion the person handling the device is less interested in the operation of the device than he is in acquiring batteries free of charge simply by removing them from the user-accessible compartment.

While the store might prefer to use relatively inexpensive button-cell batteries rather than the conventional cylindrical batteries, such button-cell batteries are typically relatively short-lived where the device has a relatively high power drain or is used extensively. Furthermore, the button-cell batteries because of their small size, when present in a user-accessible compartment, present a danger to children who may remove and swallow them (either in the store or at home) and thus are a potential legal liability for both the manufacturer and the seller of the device using the button-cell batteries. Accordingly, many electrical devices are simply not manufactured to be powered by button-cell batteries.

In addition to the differences in expense, power and the like, a critical difference between button-cell and cylindrical batteries is that the former fail, and the latter pass, a standard choke chamber test designed to distinguish between those objects which present a threat when swallowed and those which do not. Even the relatively small AA or AAA cylindrical batteries pass the choke chamber test, while button-cell batteries typically do not.

Accordingly, it is an object of the present invention to provide an electrical device with alternative battery power supplies so that the retail seller thereof avoids the effort and expense of installing a cylindrical battery supply while still obtaining the benefit of an operable electrical device for display purposes.

Another object is to provide such a device wherein the power supply cannot be removed from demonstration models.

A further object is to provide such a device providing a user-accessible compartment into which the user can insert and replace cylindrical batteries as necessary.

It is also an object of the present invention to provide such a device which can be powered for demonstration purposes and still pass a choke chamber test since there are no user-accessible button-cell batteries.

It is a further object to provide such a device which is simple and economical to manufacture, maintain and use.

SUMMARY OF THE INVENTION

It has now been found that the above and related objects of the present invention are obtained in an electrical device characterized by alternative battery supplies. The device comprises an electrical circuit, a pre-installed first battery power supply disposed in a non-user-accessible portion of the device, and a user-accessible compartment for receipt of a second battery power supply. The first supply is initially operatively connected to the circuit, and the presence of a second supply in the compartment operatively connects the second supply to the circuit to power the circuit, regardless of the presence or absence of the first supply in the circuit.

Preferably the first supply is at least one button-cell battery, and the second supply is at least one non-button-cell battery (and no button-cell batteries). Where the device is a toy for use by a child, the first supply is small enough to be easily swallowed by a child, and the second supply is not. The second supply typically has a longer useful life than the first supply.

In a first preferred embodiment, the device additionally includes means for mechanically operatively disconnecting the first supply from the circuit when the second supply is in the compartment. The disconnecting means comprises an element movable between a first orientation projecting into a portion of the compartment configured and dimensioned to be occupied by the second supply, when present, and a second orientation removed from the compartment portion. The element is biased to the first orientation. The first supply is operatively connected to the circuit when the element is in the first orientation, and the second supply is operatively connected to the circuit when the element is in the second orientation.

In a second preferred embodiment, the device additionally includes means for electromechanically operatively disconnecting the first supply from the circuit when the second supply is in the compartment and energizing the circuit. The disconnecting means comprises an electrical relay and a switch operated thereby, the relay being actuated by the presence of the second supply in the compartment.

Preferably, in the first and second embodiments removal of the second supply from the compartment automatically operatively reconnects the first supply to the circuit. Means may be provided to preclude the operative connection of both the first supply and the second supply simultaneously to the circuit.

In a third preferred embodiment, the device additionally includes means (such as a rectifier in series with the first supply) for precluding the flow of current generated by the second supply from passing through the first supply when both the first supply and the second supply are in the circuit.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
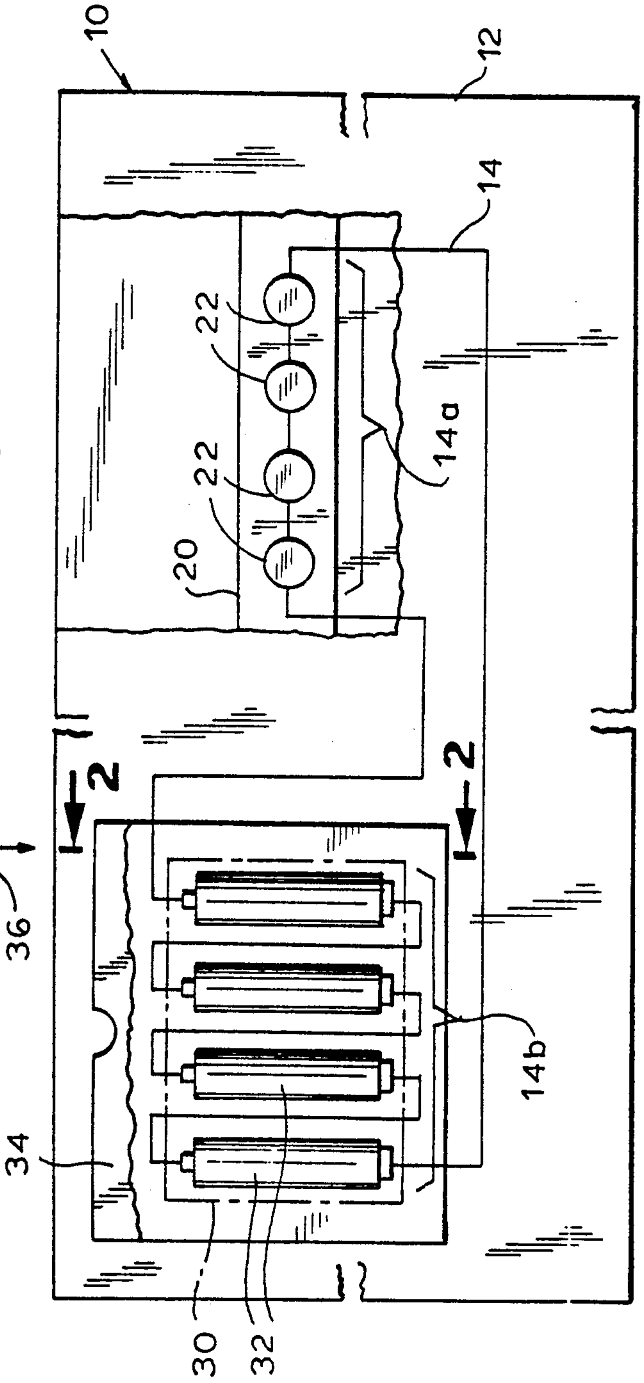
FIG. 1 is a fragmentary top plan view of an electrical device characterized by alternative battery power supplies according to the present invention, with portions thereof being cut away to reveal details of internal construction.

Referring now to the drawing, and in particular to FIG. 1 thereof, therein illustrated is a first embodiment of an electrical device according to the present invention, generally designated by the reference numeral 10. The electrical device may be a toy suitable for use by a child or any other electrical device (including electronic devices) which is operable by a battery power supply. The device includes a housing 12 and an electrical power circuit 14 disposed within the housing 12.

Within the interior of the device, the housing 12 contains a non-user-accessible portion 20 in which is disposed a pre-installed first battery power supply 22, such as four button-cell batteries connected in series. While conventional cylindrical batteries (such as AA, AAA, C, D batteries and the like) may be employed instead of the button-cell batteries, button-cell batteries are preferred since they are relatively small and inexpensive compared to the corresponding conventional cylindrical batteries and their relatively short life (compared to the conventional cylindrical batteries) is not a significant factor when the primary object of the button-cell batteries is to power the device for demonstration purposes in a store. While button-cell batteries are thus preferred for use in the housing portion 20, other batteries may be used. It is, however, critical that the first battery power supply 22 be disposed in a non-user-accessible portion 20 of the device 10, and this in turn mandates that the first supply 22 be pre-installed, e.g., factory-installed by the manufacturer. While the first supply 22 may be directly fixed to a printed circuit board or the like within the device housing 12, alternatively the housing portion 20 may be a compartment adapted to receive the first supply 22, but with the compartment cover or other access means rendering the compartment non-accessible to a user, for example, by sonic or thermal welding, gluing or the like of the cover on the compartment.

Figure 2B:
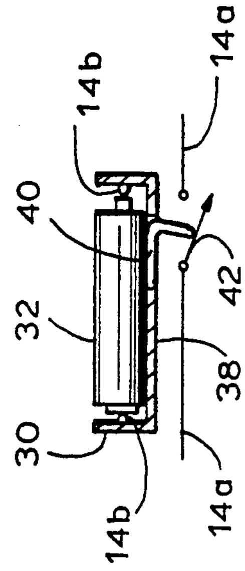
FIGS. 2A and 2B are sectional views taken along the line 2—2 of FIG. 1, with FIG. 2A showing the user-accessible battery compartment in the absence of batteries and FIG. 2B showing the same compartment with the batteries present therein, the functional effects being illustrated therebelow in the open/close position of a switch in the button-cell battery circuit portion.
Figure 2A:
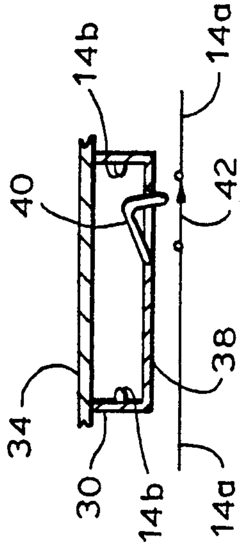

Referring now to FIGS. 2A and 2B as well, the housing 12 additionally defines a user-accessible compartment generally designated 30 for receiving a second battery power supply 32, such as four conventional cylindrical batteries connected in series, as illustrated. The presence of the second supply 32 within the compartment 30 puts the second supply 32 into the electrical circuit 14. Typically the compartment 30 is covered by means of a pivotable or removable cover 34 which normally assists in retaining in the second supply 32 in place within the compartment 30, yet is replaceably removable (e.g., in the direction of double-headed arrow 36) or pivotable to enable insertion and replacement of the second supply 32, the lid being movable for removal and replacement. It will be appreciated that the compartment 30 as described hereinabove is conventional in nature.

A portion **14*a* of circuit 14 containing the first supply 22 is in parallel with a portion 14*b* of circuit 14 containing the second supply 32 so that either the first or the second supply 22, 32 may independently power the electrical circuit 14, regardless of the presence of absence of the other supply 32, 22**.

Referring now especially to FIGS. 2A and 2B, a resiliently biased lever 40 is disposed within the bed or seat for at least one of the batteries of the second battery power supply 32. In the absence of such batteries in compartment 30, the lever 40 extends upwardly from the bed or seat 38 and allows a normally closed switch 42 to remain in the closed orientation, as illustrated in FIG. 2A. Thus circuit portion **14*a* is a functional part of circuit 14. On the other hand, when a battery of the first supply 32 is inserted into the bed or seat 38 so as to complete circuit portion 14*b*, the lever 40 is physically depressed and mechanically opens switch 42, as illustrated in FIG. 2B. The opening of switch 42 in turn opens circuit portion 14*a* so that the first supply 22 is no longer a functional part of the circuit 14. However, once all of the batteries of the second supply 32 are appropriately inserted into compartment 30, circuit portion 14*b* provides power to the remainder of circuit 14**.

Thus, while the first battery power supply 22 is initially operatively connected to the circuit 14, the presence of a second battery power supply 32 in the user-accessible compartment 30 operatively connects the second supply 32 to the circuit 14 to power the circuit 14, regardless of the presence or absence of the first supply 22 in the circuit. Furthermore, the depression of lever 40 (as the second supply 32 is placed in the user-accessible compartment 30) operates switch 42 to mechanically operatively disconnect the first supply 22 from circuit 14. The lever 40 thus acts as an element movable between a first orientation projecting into a portion of the compartment 30 configured and dimensioned to be occupied by the second supply 32, when present, and a second orientation removed from that compartment portion, the element being biased to the first orientation. The first supply 22 and its circuit portion **14*a* is operatively connected to the circuit 14 when the element 40 is in the first orientation, and the second supply 32 and its circuit portion 14*b* is operatively connected to the circuit 14 when the element 40 is in the second orientation. The lever 40 precludes the operative connection of both the first supply 22 and the second supply 32 simultaneously to the circuit 14 so that the second power supply 32 is not dissipated attempting to charge the first supply 22, or vice versa, as might happen if both supplies 22, 32 were operatively present in the circuit 14** at the same time.

While the purchaser is instructed to immediately insert the second power supply 32 within the user-accessible compartment 30, so as to provide a long-lived operation of the device 10, it is to be expected that many users will continue to rely on the factory-installed first supply 22 until that has been dissipated, and only then insert a second supply 32 in the user-accessible compartment 30. Accordingly, it is most important that the second supply 32 be saved from a futile attempt to charge the dissipated first supply 22, this function being performed in the first embodiment of the present invention by the lever 40 acting on the switch 42. However, for those purchasers who are conscientious enough to install the second supply 32 prior to their use of the device 10 after purchase, the present invention provides a further reward. At such time as the second supply 32 becomes exhausted and no longer capable of powering the circuit 14, the second supply 32 may be removed from the user-accessible compartment 30. This permits the lever 40, which is resiliently biased to the raised or first orientation, to return to its original raised or first orientation, thereby closing switch 42 and returning the first supply 22 to the circuit 14. Assuming that the first supply 22 has not yet been exhausted, continued operation of the device 10 is possible until the first supply 22 becomes exhausted. If the user relatively promptly replaces the second supply 32, he can preserve what remains of the first supply 22 for use in another such situation (that is, when the new second supply 32 becomes exhausted).

Figure 4:
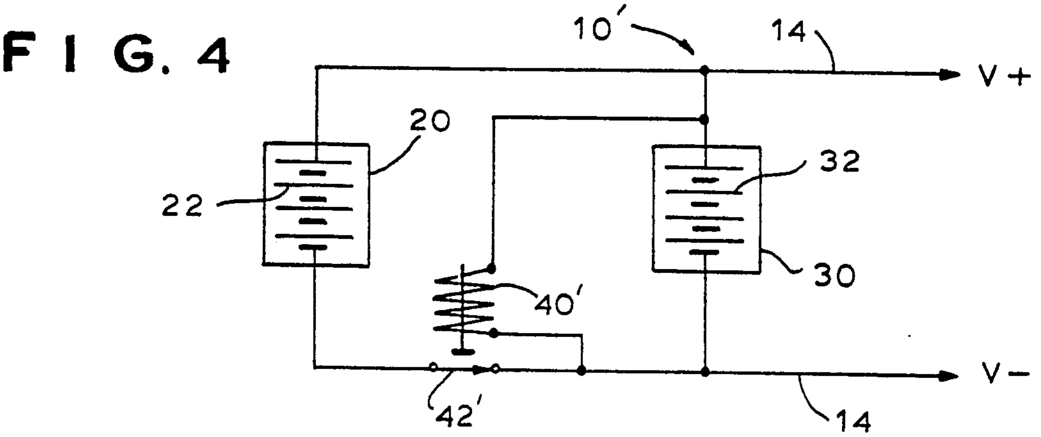
FIG. 4 is a circuit diagram similar to FIG. 3, but using an electromechanical switch.
Figure 3:
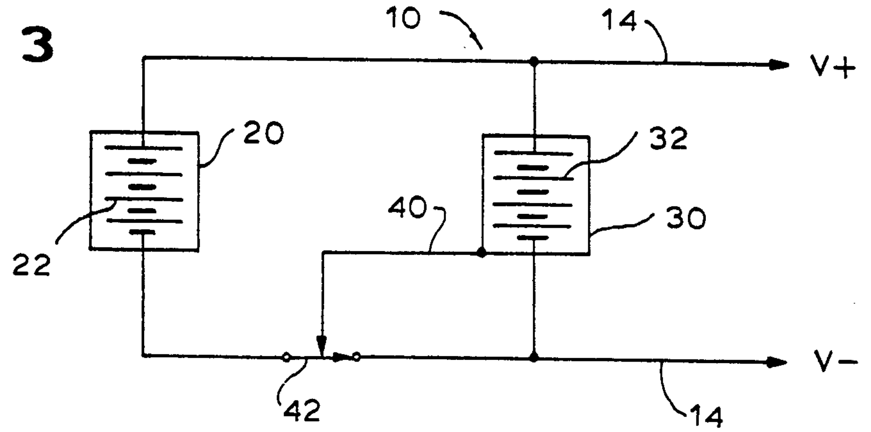
FIG. 3 is a circuit diagram of the power supply for the device of FIG. 1 incorporating a purely mechanical switch in the button-cell battery circuit.

Referring now to FIG. 4, therein illustrated is a circuit diagram for a second embodiment of the present invention, generally designated 10', utilizing an electromechanical switch. Like elements of the second embodiment 10' are designated by the same numeral as the corresponding element of the first embodiment 10. In this second embodiment 10', the switch 42' (corresponding to switch 42 of the first embodiment) is normally closed so that initially the circuit 14 is powered by the first supply 22. However, when the second supply 32 is placed in the user-accessible compartment 30, this actuates an electrical relay 40' (analogous to mechanical lever 40) which causes switch 42' to open, thereby removing the first supply 22 from circuit 14 and leaving circuit 14 powered only by the second supply 32.

The second embodiment 10' has the advantage of avoiding the dangers inherent in a breakable lever 40 of the first embodiment, but the disadvantage of a small but constant drain of the second supply 32 (even when the device is off) so as to keep relay 40' actuated. Unlike the first embodiment 10, it is not necessary to remove the second supply 32 from the user-accessible compartment 30 when the second supply 32 is exhausted, as the exhaustion of the second supply 32 will automatically de-activate relay 40' and thereby allow closure of switch 42', thus operatively returning the first supply 22 to the circuit 14.

Figure 5:
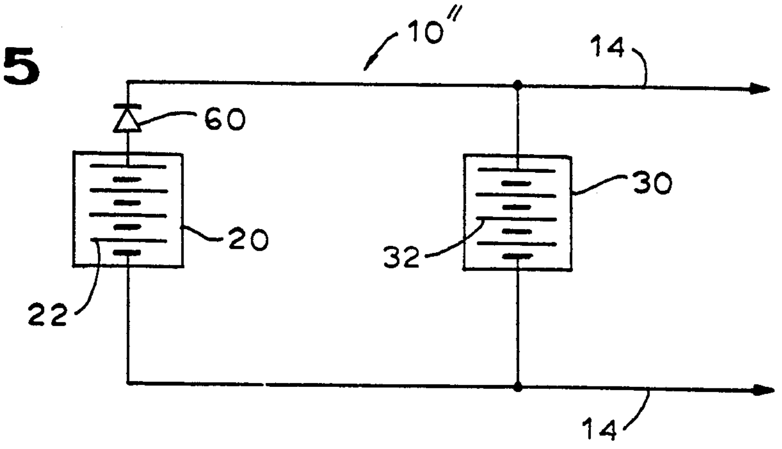
FIG. 5 is a circuit diagram similar to FIG. 3, but using electronic techniques rather than a mechanical or an electromechanical switch.

Referring now to FIG. 5, therein illustrated is a third embodiment of the present invention, generally designated 10'', which employs neither lever 40 of the first embodiment 10 nor the lever 40' of the second embodiment 10'. Like elements of the third embodiment 10'' are designated by the same numeral as the corresponding element of the first embodiment 10. Unlike either of the earlier-described embodiments 10, 10', in this embodiment the first supply 22 remains in the circuit 14 at all times. In order to prevent dissipation of the power of the second supply 32 in a futile attempt to recharge the first supply 22, a rectifier 60 (such as a diode) is appropriately disposed in circuit portion **14*b*. When the first supply 22 is exhausted, it has no effect on the circuit 14. When the first supply 22 is powered, it will generate additional current to that supplied by the second supply 32. Of course, the electrical circuit 14 must be able to withstand the variation in current flowing therein in the third embodiment 10'', depending upon the strength of the first supply 22**.

It will be appreciated that when the first supply 22 is strong and the second supply 32 is weak, the first supply 22 will waste some of its power in attempting to charge the second supply 32. This unusual situation can be avoided, if desired, by appropriate placement of another rectifier (not shown) in series with the second supply 32. The third embodiment 10'' eliminates the need for switch 42, 42' and lever/relay 40, 40' of the first and second embodiments at the expense of only one (or at most two) inexpensive diodes.

To summarize, the present invention provides an electrical device with alternative battery power supplies so that the retailer avoids the effort and expense of installing cylindrical battery supplies while still obtaining the benefit of an operable electrical device for display purposes. The preinstalled button-cell power supply provided by the manufacturer is not user-accessible so that the power supply cannot be removed from demonstration models. The device also has a user-accessible compartment into which the user can insert and replace cylindrical batteries as necessary. Thus the device can be powered for demonstration purposes with the manufacturer-supplied pre-installed button-cell batteries and still pass a choke chamber test since there are no user-accessible button-cell batteries. The device is simple and economical to manufacture, maintain and use. In all instances, removal of the user-installed cylindrical battery supply enables the device to return to operation on the button-cell batteries, assuming that they are still capable of powering the device.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. An electrical device characterized by alternative battery power supplies, comprising:

(A) an electrical circuit;

(B) a pre-installed first button-cell battery power supply small enough to be easily swallowed by a child, said first supply being disposed in a non-user-accessible portion of said device; and (C) a user-accessible compartment for receipt of a second non-button-cell battery power supply to large to be easily swallowed by a child;

said first supply being initially operatively connected to said circuit, and the presence of a second supply in said compartment operatively connecting the second supply to said circuit to power said circuit regardless of the presence or absence of said first supply in said circuit.

2. The device of claim 1 including means precluding the operative connection of both said first supply and the second supply simultaneously to said circuit.

3. The device of claim 1 additionally including means for precluding the flow of current generated by the second supply from passing through said first supply when both said first supply and the second supply are in said circuit.

4. The device of claim 3 wherein said precluding means is a rectifier in series with said first supply.

5. The device of claim 1 wherein the second supply has a longer useful life than said first supply.

6. An electrical device characterized by alternative battery power supplies, comprising:

(A) an electrical circuit;

(B) a pre-installed first battery power supply disposed in a non-user-accessible portion of said device;

(C) a user-accessible compartment for receipt of a second battery power supply; and (D) means for mechanically operatively disconnecting said first supply from said circuit when the second supply is in said compartment;

said first supply being initially operatively connected to said circuit, and the presence of a second supply in said compartment operatively connecting the second supply to said circuit to power said circuit regardless of the presence or absence of said first supply in said circuit.

7. The device of claim 6 wherein said disconnecting means comprises an element movable between a first orientation projecting into a portion of said compartment configured and dimensioned to be occupied by the second supply, when present, and a second orientation removed from said compartment portion.

8. The device of claim 7 wherein said element is biased to said first orientation.

9. The device of claim 7 wherein said first supply is operatively connected to said circuit when said element is in said first orientation, and the second supply is operatively connected to said circuit when said element is in said second orientation.

10. The device of claim 6 wherein removal of the second supply from said compartment automatically operatively reconnects said first supply to said circuit.

11. An electrical device characterized by alternative battery power supplies, comprising:

(A) an electrical circuit;

(B) a pre-installed first battery power supply disposed in a non-user-accessible portion of said device;

(C) a user-accessible compartment for receipt of a second battery power supply; and (D) means for electromechanically operatively disconnecting said first supply from said circuit when the second supply is in said compartment and energizing said circuit;

said first supply being initially operatively connected to said circuit, and the presence of a second supply in said compartment operatively connecting the second supply to said circuit to power said circuit regardless of the presence or absence of said first supply in said circuit.

12. The device of claim 11 wherein said disconnecting means comprises an electrical relay and a switch operated thereby, said relay being actuated by the presence of the second supply in said compartment.

13. An electrical device characterized by alternative battery power supplies, comprising:

(A) an electrical circuit;

(B) a pre-installed first battery power supply disposed in a non-user-accessible portion of said device and including at least one button-cell battery;

(C) a user-accessible compartment for receipt of a second battery power supply including at least one non-button-cell battery; and (D) means for mechanically operatively disconnecting said first supply from said circuit, including an element movable between a first orientation projecting into a portion of said compartment configured and dimensioned to be occupied by the second supply, when present, and a second orientation removed from said compartment portion, said first supply being operatively connected to said circuit when said element is in said first orientation, and the second supply being operatively connected to said circuit when said element is in said second orientation, said element being biased to said first orientation and precluding the operative connection of both said first supply and the second supply simultaneously to said circuit;

said first supply being initially operatively connected to said circuit, and the presence of a second supply in said compartment both operatively connecting the second supply to said circuit and operatively disconnecting said first supply from said circuit.

14. The device of claim 13 wherein removal of the second supply from said compartment automatically operatively reconnects said first supply to said circuit.

* * * * *